(12) United States Patent
Millgård

(10) Patent No.: US 6,324,489 B1
(45) Date of Patent: Nov. 27, 2001

(54) AIRCRAFT IDENTIFICATION AND DOCKING GUIDANCE SYSTEMS

(75) Inventor: Lars Millgård, Östersund (SE)

(73) Assignee: Safegate International AB, Malmo (SE)

( * ) Notice: Subject to any disclaimer, the term of this patent is extended or adjusted under 35 U.S.C. 154(b) by 0 days.

(21) Appl. No.: 09/429,609

(22) Filed: Oct. 29, 1999

Related U.S. Application Data (6362) Continuation-in-part of application No. 08/817,368, filed as application No. PCT/SE94/00968 on Oct. 14, 1994, now Pat. No. 5,675,661.

(51) Int. Cl.⁷ ....................................................... G06F 9/62
(52) U.S. Cl. .................... 702/151; 702/152; 702/159; 356/3.14; 382/104; 382/216; 340/958
(58) Field of Search ..................... 702/151, 152, 702/159; 701/26, 206; 318/587; 356/4.01, 5.01, 376, 3.14; 382/104, 216; 340/958

(56) References Cited

U.S. PATENT DOCUMENTS

| | | | |
|---|---|---|---|
| 4,319,332 | 3/1982 | Mehnert | 342/158 |
| 4,995,102 | 2/1991 | Ichinose et al. | 342/49 |
| 5,424,746 | 6/1995 | Schwab et al. | 342/49 |
| 5,475,370 | 12/1995 | Stern | 340/583 |
| 5,589,822 | 12/1996 | Stern | 340/583 |
| 5,675,661 | 10/1997 | Richman et al. | 382/104 |
| 6,100,964 | 8/2000 | De Cremiers | 356/4.01 |

FOREIGN PATENT DOCUMENTS

| | | |
|---|---|---|
| 4009668 | 10/1991 | (DE) . |
| 4301637 | 8/1994 | (DE) . |
| 0035101 | 9/1981 | (EP) . |
| 188757 | 7/1986 | (EP) . |
| WO 93 13104 | 7/1993 | (WO) . |
| WO 93 15416 | 8/1993 | (WO) . |

OTHER PUBLICATIONS

Database WPI, Section El, Week 9332, Derwent Publications, Ltd., London, GB, Class S02, AN 93–256658, Aug. 7, 1992 (Abstract).

Database WPI, Section El, week 9514, Derwent Publications, Ltd., London, GB, Class T04, AN 95–105467, Dec. 13, 1994 (Abstract).

*Primary Examiner*—Kamini Shah
(74) *Attorney, Agent, or Firm*—Blank Rome Comisky & McCauley LLP

(57) ABSTRACT

A laser range finder (LRF) is used to identify an aircraft approaching a gate. The LRF is directed at the aircraft, and from the echoes, a profile is derived and compared to known profiles. To distinguish among aircraft with similar profiles, the LRF is directed at a volume in which a feature such as an engine is expected and at another volume in which the engine is not expected. The echoes from the two volumes are used to determine whether the engine is in its expected location. If so, the aircraft is identified as the correct type and is allowed to dock at the gate. Otherwise, the aircraft is stopped. The nose height can be used as yet another identifying criterion.

28 Claims, 11 Drawing Sheets

AIRCRAFT IDENTIFICATION AND DOCKING GUIDANCE SYSTEMS

REFERENCE TO RELATED INVENTION

This is a continuation-in-part of U.S. patent application Ser. No. 08/817,368, filed Jul. 17, 1997, now U.S. Pat. No. 5,675,661, which is the U.S. national stage of PCT International Application No. PCT/SE94/00968, filed Oct. 14, 1994, published Apr. 25, 1996, as WO 96/12265 A1. The disclosure of the parent application is hereby incorporated by reference in its entirety into the present disclosure.

BACKGROUND OF THE INVENTION

1. Field of the Invention

This invention relates to systems for locating, identifying and tracking objects. More particularly, it related to aircraft location, identification and docking guidance systems and to ground traffic control methods for locating and identifying objects on an airfield and for safely and efficiently docking aircraft at such airport.

2. Description of Related Art

In recent years there has been a significantly increased amount of passenger, cargo and other aircraft traffic including take offs, landings and other aircraft ground traffic. Also, there has been a marked increase in the number of ground support vehicles which are required to off load cargo, provide catering services and on going maintenance and support of all aircraft. With this substantial increase in ground traffic has come a need for greater control and safety in the docking and identification of aircraft on an airfield.

Exemplary of prior art systems which have been proposed for detecting the presence of aircraft and other traffic on an airfield are those systems disclosed in U.S. Pat. No. 4,995,102; European Patent No. 188 757; and PCT Published Applications WO 93/13104 and WO 93/15416.

However, none of those systems have been found to be satisfactory for detection of the presence of aircraft on an airfield, particularly, under adverse climatic conditions causing diminished visibility such as encountered under fog, snow or sleet conditions. Furthermore, none of the systems disclosed in the prior references are capable of identifying and verifying the specific configuration of an approaching aircraft. Still further, none of the prior systems provide adequate techniques for tracking and docking an aircraft at a designated stopping point such as an airport loading gate. Also, none of the prior systems have provided techniques which enable adequate calibration of the instrument therein.

The system disclosed in the above-cited parent application seeks to overcome the above-noted problems though profile matching. Light pulses from a laser range finder (LRF) are projected in angular coordinates onto the airplane. The light pulses are reflected off the airplane to detect a shape of the airplane or of a portion of the airplane, e.g., the nose. The detected shape is compared with a profile corresponding to the shape of a known model of airplane to determine whether the detected shape corresponds to the shape of the known model.

However, that system has a drawback. Often, two or more models of airplanes have profiles so similar that one model is often misidentified as another. In particular, in adverse weather, many echoes are lost, so that profile discrimination becomes decreasingly reliable. Since the models are similar but not identical in body configuration, a correct docking position for one can cause an engine on another to crash into a physical obstacle.

Thus, it has been a continuing problem to provide systems which are sufficiently safe and reliable over a wide range of atmospheric conditions to enable detection of objects such as aircraft and other ground traffic on an airfield.

In addition, there has been a long standing need for systems which are not only capable of detecting objects such as aircraft, but which also provide for the effective identification of the detected object and verification of the identity of such object, for example, a detected aircraft with the necessary degree of certainty regardless of prevailing weather conditions and magnitude of ground traffic.

There has also been a long standing, unfulfilled need for systems which are capable of accurately and efficiently tracking and guiding objects such as incoming aircraft to a suitable stopping point such as an airport loading gate. In addition, the provision of accurate and effective calibration techniques for such systems has been a continuing problem requiring resolution.

SUMMARY OF THE INVENTION

It will be readily apparent from the above that a need exists in the art for a more accurate identification of aircraft.

It is therefore a primary object of the invention to distinguish among multiple models of aircraft with identical or almost identical nose shapes.

It is a further object of the invention to improve the detection of aircraft so as to avoid accidents during aircraft docking.

To achieve the above and other objects, the present invention identifies aircraft in a two-step process. First, the profile matching is performed as known from the above-identified parent application. Second, at least one aircraft criterion matching is performed. In the aircraft criterion matching, a component of the aircraft, such as the engine, is selected as a basis for distinguishing among aircraft. The displacement of that component from another, easily located component, such as the nose, is determined in the following manner. An inner volume in which the engine is expected is defined, and an outer volume surrounding the inner volume is also defined. The LRF is directed at the inner and outer volumes to produce echoes from both volumes. A ratio is taken of the number of echoes in the inner volumes to the number of echoes in both volumes. If that echo exceeds a given threshold, the engine is determined to be present in the inner volume, and the aircraft is considered to be identified. If the identification of the aircraft is still ambiguous, another aircraft criterion, such as the tail, can be detected.

The aircraft criteria chosen for the second phase of the identification are physical differences that can be detected by a laser range finder. An example of such a criterion is the position, sideways and lengthwise, of an engine in relation to the aircraft nose. To consider an aircraft identified, the echo pattern must not only reflect a fuselage of correct shape. It must also reflect that there is an engine at a position, relative to the nose, where the expected aircraft does have an engine. Other examples of criteria that can be used are the position of the main gear, the position of the wings and the position of the tail.

The matching is preferably done only against the criteria specific for the expected aircraft type. It would be very time consuming to match against the criteria of all other possible types. Such matching would have to be against every type of aircraft that may land at a specific airport.

For each gate there is a defined a stopping position for each aircraft type that is planned to dock at that gate. There might be a safety risk for any other type to approach the gate. The stopping position is defined so that there is a sufficient safety margin between the gate and the aircraft to avoid collision. The stopping position for each aircraft type is often defined as the position of the nose gear when the door is in appropriate position in relation to the gate. There is a database in the system where the distance from the nose to the nose gear is stored for each aircraft type. The docking system guides the aircraft with respect to its nose position and stops the aircraft with its nose in a position where the correct type will have its nose gear in the correct stop position. If the wrong type is docked and if it has its wings or engines closer to the nose than the correct type, there is a risk of collision with the gate.

During the aircraft criteria phase, all aircraft criteria specified for the expected aircraft type can be checked. If an aircraft has a profile that can be used to discriminate it from any other type, which is rarely the case, the profile will be the only aircraft criterion. Otherwise, another criterion such as the position of the engine is checked, and if the identification is still ambiguous, still another criterion such as the position of the tail is checked.

The LRF is directed to obtain echoes from the inner and outer volumes. If the ratio of the number of echoes from within the inner volume to the number of echoes from within both volumes is larger than a threshold value, the aircraft is identified as having an engine at the right position, and that specific criterion is thus fulfilled. The ratio of the echo numbers is, however, just an example of a test used to evaluate the presence of an engine at the right position or to determine whether the echoes come from some other source, e.g., a wing. In cases in which this is the only criterion, the aircraft is considered to be identified. Otherwise, the other specified criteria (e.g., the height of the nose of the aircraft or evaluation of another aircraft criterion) have to be fulfilled.

If necessary, several characteristics, such as the tail, gears, etc., can be used to identify one specific type. The inner and outer volumes are then defined for each geometrical characteristic to be used for the identification. The exact extension of the volumes is dependent on the specific aircraft type and so is the threshold value.

A further identification criterion is the nose height. The nose height is measured so as to allow the horizontal scan to be placed over the tip of the nose. The measured nose height is also compared with the height of the expected aircraft. If the two differ by more than 0.5 m, the aircraft is considered to be of wrong type, and the docking is stopped. The value 0.5 m is given by the fact that the ground height often varies along the path of the aircraft which makes it difficult to measure with higher accuracy.

The invention lends itself to the use of "smart" algorithms which minimize the demand on the signal processing at the same time as they minimize the effect of adverse weather and bad reflectivity of aircraft surface. The advantage is that low-cost microcomputers can be used, and/or computer capacity is freed for other tasks, and that docking is possible under almost all weather conditions.

One important algorithm in this respect is the algorithm for handling of the reference profiles. The profile information is stored as a set of profiles. Each profile in the set reflects the expected echo pattern for the aircraft at a certain distance from the system. The position of an aircraft is calculated by calculating the distance between the achieved echo pattern with the closest reference profile. The distance interval between the profiles in the set is chosen so short that the latter calculation can be made using approximations and still maintain the necessary accuracy. Instead of using scaling with a number of multiplications, which is a demanding operation, simple addition and subtraction can be used.

Another important algorithm is the algorithm for determining an aircraft's lateral deviation from its appropriate path. That algorithm uses mainly additions and subtractions and only very few multiplications and divisions. The calculation is based on areas between the reference profile and the echo pattern. As these areas are not so much affected by position variations or absence of individual echoes the algorithm becomes very insensitive to disturbances due to adverse weather.

The calibration procedure enables a calibration check against an object at the side of the system. The advantage is that such a calibration check is possible also when no fixed object is available in front of the system. In most cases, there are no objects in front of the system that can be used. It is very important to make a calibration check regularly. Something might happen to the system, e.g., such that the aiming direction of the system is changed. This can be due to an optical or mechanical error inside the system or it can be due to a misalignment caused by an external force such as from a passing truck. If this happens, the system may guide an aircraft to a collision with objects at the side of its appropriate path.

BRIEF DESCRIPTION OF THE DRAWINGS

The features and advantages of the invention will become apparent from the following detailed description taken in connection with the accompanying drawings wherein.

Table I is a preferred embodiment of a Horizontal Reference Profile Table which is employed to establish the identity of an aircraft in the systems of the present invention;

Table II is a preferred embodiment of a Comparison Table which is employed in the systems of the present invention for purposes of effectively and efficiently docking an aircraft.

DETAILED DESCRIPTION OF THE PREFERRED EMBODIMENT

Reference is now made to FIGS. 1–14 and Tables I–II, in which like numerals designate like elements throughout the several views. Throughout the following detailed description, numbered stages depicted in the illustrated flow diagrams are generally indicated by element number in parenthesis following such references.

Figure 1:
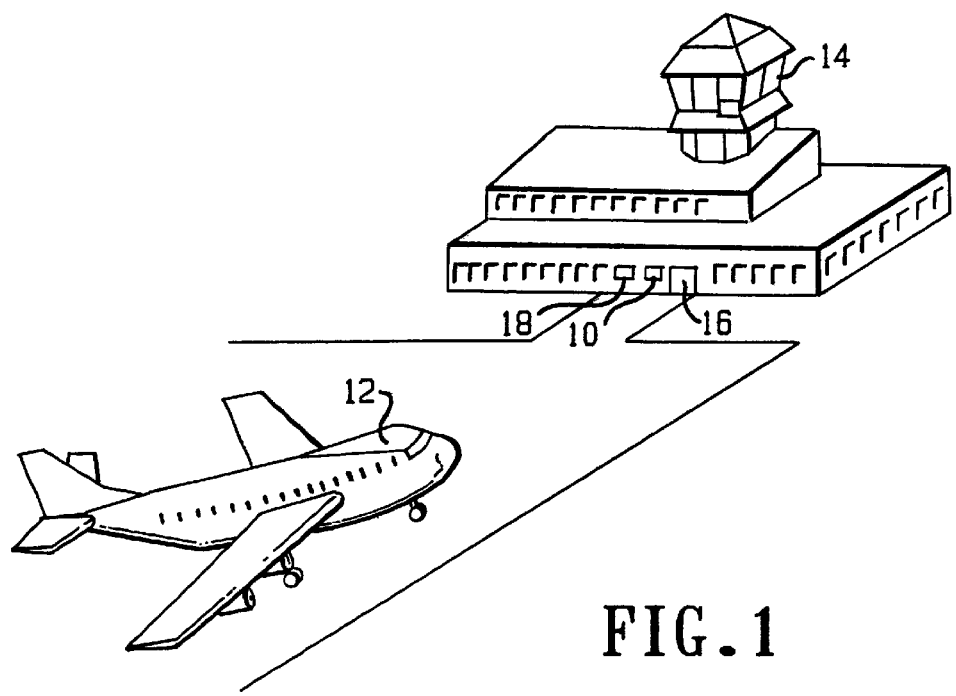
FIG. 1 is a view illustrating the system as in use at an airport.

Referring to FIG. 1, the systems of the present invention generally designated 10 in the drawings provide for the computerized location of an object, verification of the identity of the object and tracking of the object, the object preferably being an aircraft 12. In operation, once the control tower 14 lands an aircraft 12, it informs the system that a plan is approaching gate 16 and the type of aircraft (i.e., 747, L-1011, etc.) expected. The system 10 then scans the area in front of the gate 16 until it locates an object that it identifies as an airplane 12. The system 10 then compares the measured profile of the aircraft 12 with a reference profile for the expected type of aircraft and evaluates other geometric criteria characteristic of the expected aircraft type. If the located aircraft does not match the expected profile and the other criteria, the system informs or signals the tower 14 and shuts down.

If the object is the expected aircraft 12, the system 10 tracks it into the gate 16 by displaying in real time to the pilot the distance remaining to the proper stopping point 29 and the lateral position 31 of the plane 12. The lateral position 31 of the plane 12 is provided on a display 18 allowing the pilot to correct the position of the plane to approach the gate 16 from the correct angle. Once the airplane 12 is at its stopping point 53, this fact is shown on the display 18 and the pilot stops the plane. Employing the system 10 of the present invention, it should be noted that once the plane 12 comes to rest, it is accurately aligned with the gate 16 requiring no adjustment of the gate 16 by the ground staff.

Figure 2:
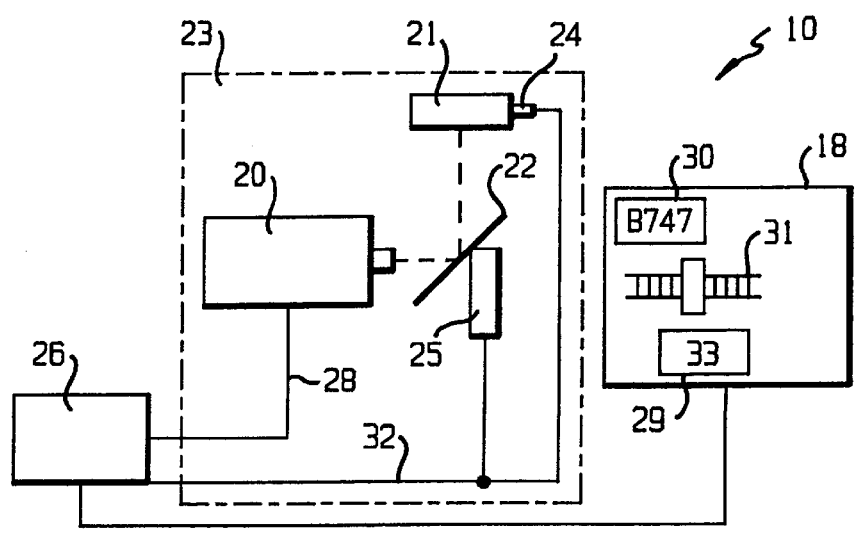
FIG. 2 is a diagrammatic view illustrating the general componentry of a preferred system in accordance with the present invention.

Referring to FIG. 2, the system 10 includes a Laser Range Finder (LRF) 20, two mirrors 21, 22, a display unit 18, two step motors 24, 25, and a microprocessor 26. Suitable LRF products for use herein are sold by Laser Atlanta Corporation and are capable of emitting laser pulses and receiving the reflections of those pulses reflected off of distant objects and computing the distance to those objects.

The system 10 is arranged such that there is a connection 28 between the serial port of the LRF 20 and the microprocessor 26. Through this connection, the LRF 20 sends measurement data approximately every 1/400th of a second to the microprocessor 26. The hardware components generally designated 23 of the system 20 are controlled by the programmed microprocessor 26. In addition, the microprocessor 26 feeds data to the display 18. As the interface to the pilot, the display unit 18 is placed above the gate 16 to show the pilot how far the plane is from its stopping point 29, the type of aircraft 30 the system believes is approaching and the lateral location of the plane 3 1. Using this display, the pilot can adjust the approach of the plane 12 to the gate 16 to ensure the plane is on the correct angle to reach the gate. If the display 18 shows the wrong aircraft type 30, the pilot can abort the approach before any damage is done. This double check ensures the safety of the passengers, plane and airport facilities because if the system tries to maneuver a larger 747 as though it were a 737, it likely will cause extensive damage.

In addition to the display 18, the microprocessor 26 processes the data from LRF 20 and controls the direction of the laser 20 through its connection 32 to the step motors 24, 25. The step motors 24, 25 are connected to the mirrors 21, 22 and move them in response to instructions from the microprocessor 26. Thus, by controlling the step motors 24, 25, the microprocessor 26 can change the angle of the mirrors 21, 22 and aim the laser pulses from the LRF 20.

The mirrors 21, 22 aim the laser by reflecting the laser pulses outward over the tarmac of the airport. In the preferred embodiment, the LRF 20 does not move. The scanning by the laser is done with mirrors. One mirror 22 controls the horizontal angle of the laser while the other mirror 21 controls the vertical angle. By activating the step motors 24, 25, the microprocessor 26 controls the angle of the mirrors and thus the direction of the laser pulse.

The system 10 controls the horizontal mirror 22 to achieve a continuous horizontal scanning within a ±10 degree angle in approximately 0.1 degree angular steps which are equivalent to 16 microsteps per step with the Escap EDM-453 step motor. One angular step is taken for each reply from the reading unit, i.e., approximately every 2.5 ms. The vertical mirror 21 can be controlled to achieve a vertical scan between +20 and −30 degrees in approximately 0.1 degree angular steps with one step every 2.5 ms. The vertical mirror is used to scan vertically when the nose height is being determined and when the aircraft 12 is being identified. During the tracking mode, the vertical mirror 21 is continuously adjusted to keep the horizontal scan tracking the nose tip of the aircraft 12.

Figure 3:
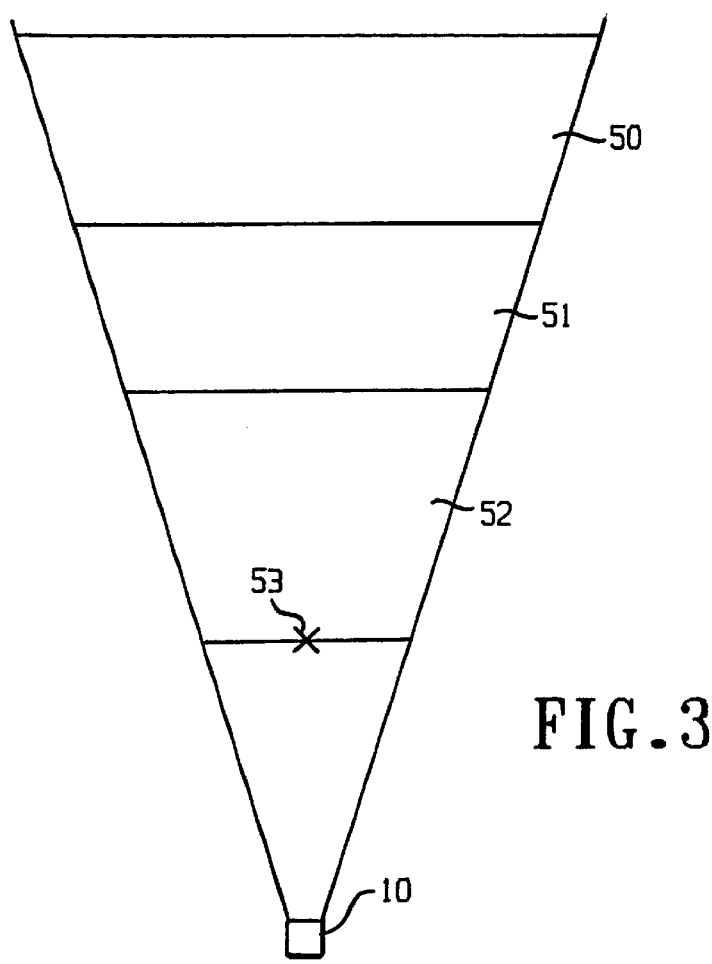
FIG. 3 is a top plan view illustrating the detection area in front of a docking gate which is established for purposes of detection and identification of approaching aircraft.

Referring to FIG. 3, the system 10 divides the field in front of it by distance into three parts. The farthest section, from about 50 meters out, is the capture zone 50. In this zone 50, the system 10 detects the aircraft's nose and makes a rough estimate of lateral and longitudinal position of the aircraft 12. Inside the capture zone 50 is the identification area 51. In this area, the system 10 checks the profile of the aircraft 12 against a stored profile 51. In this area, the system 10 checks the profile of the aircraft 12 in this region, related to a predetermined line, on the display 18. Finally, nearest to the LRF 20 is the display or tracking area 52. In the display area 52, the system 10 displays the lateral and longitudinal position of the aircraft 12 relative to the correct stopping position with its highest degree of accuracy. At the end of the display area 52 is the stopping point 53. At the stopping point 53, the aircraft will be in the correct position at the gate 16.

In addition to the hardware and software, the system 10 maintains a database containing reference profiles for any type of aircraft it might encounter. Within this database, the system stores the profile for each aircraft type as a horizontal and vertical profile reflecting the expected echo pattern for that type of aircraft.

Referring to Table I, the system maintains the horizontal profile in the form of a Table I whose rows 40 are indexed by angular step and whose columns 41 are indexed by distance from the stopping position for that type of aircraft. In addition to the indexed rows, the table contains a row 42 providing the vertical angle to the nose of the plane at each distance from the LRF a row 44 providing the form factor, k, for the profile and a row 45 providing the number of profile values for each profile distance. The body 43 of the Table I contains expected distances for that type of aircraft at various scanning angles and distances from the stopping point 53.

Theoretically, the 50 angular steps and the 50 distances to the stopping point 53 would require a Table I containing 50×50, or 2500, entries. However, Table I will actually contain far fewer entries because the profile will not expect a return from all angles at all distances. It is expected that a typical table will actually contain between 500 and 1000 values. Well known programming techniques provide methods of maintaining a partially full table without using the memory required by a full table.

In addition to the horizontal profile, the system 10 maintains a vertical profile of each type of aircraft. This profile is stored in the same manner as the horizontal profile, except that its rows are indexed by angular steps in the vertical direction and its column index contains fewer distances from the stopping position than the horizontal profile. The vertical profile requires fewer columns because it is used only for identifying the aircraft 12 and for determining its nose height, which take place at a defined range of distances from the LRF 20 in the identification area 51. Consequently, the vertical profile stores only the expected echoes in that range without wasting data storage space on unneeded values.

Figure 4A:
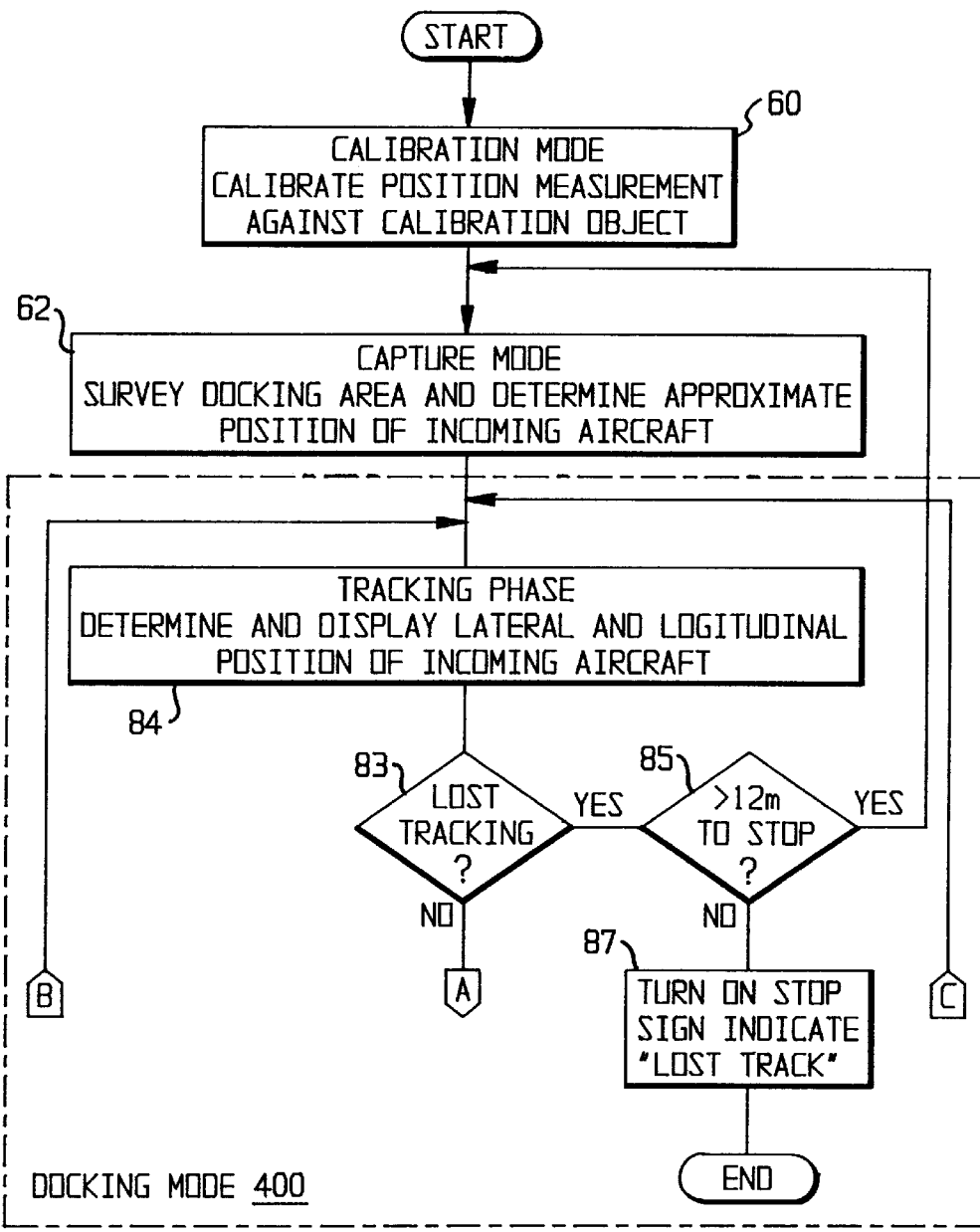
FIGS. 4A and 4B together show a flow chart illustrating the main routine and the docking mode of the system.
Figure 4B:
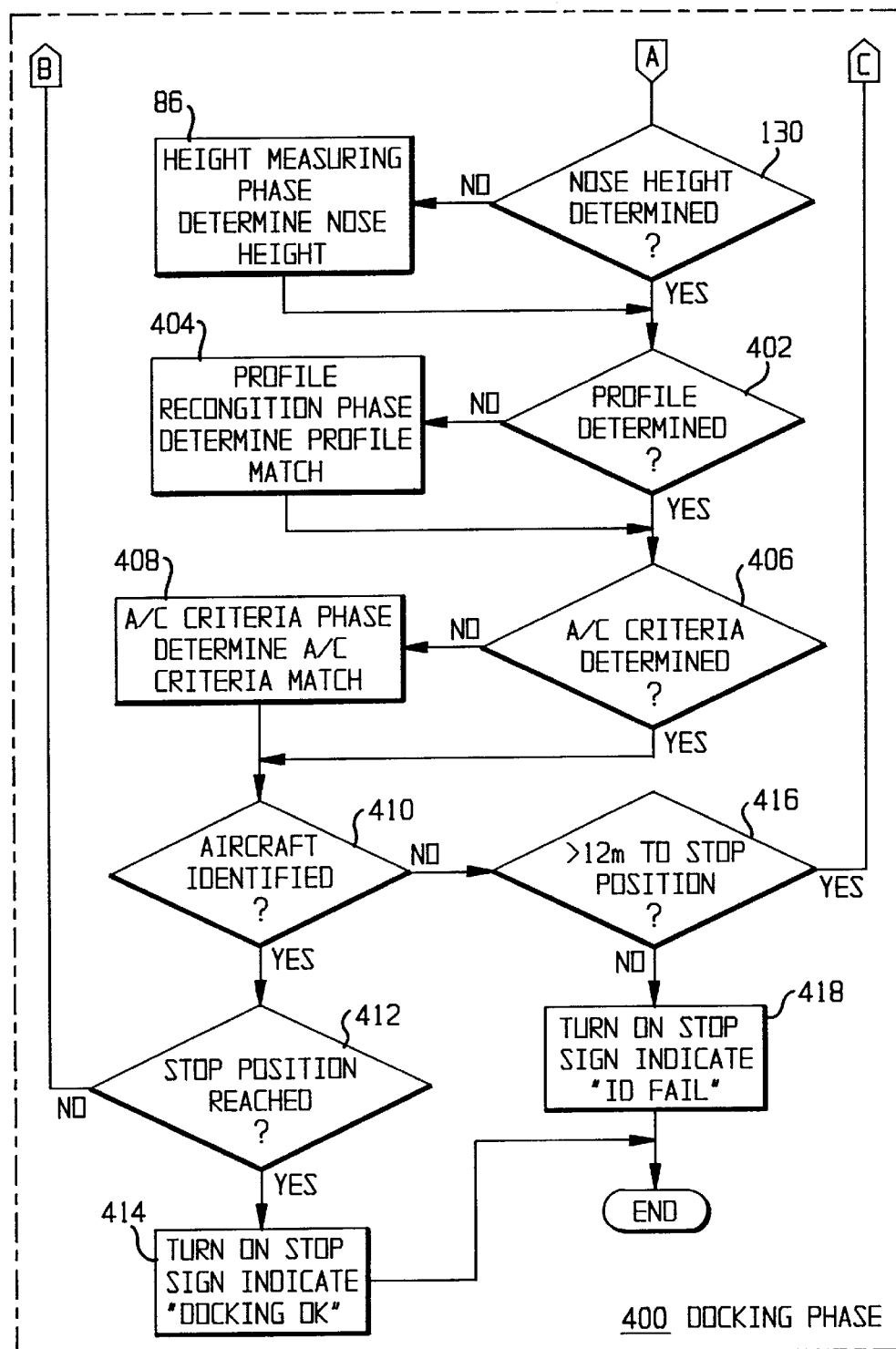

The system 10 uses the previously described hardware and database to locate, identify and track aircraft using the following procedures:

Referring to FIGS. 4A and 4B, the software running on the microprocessor performs a main routine containing subroutines for the calibration mode 60, capture mode 62 and docking mode 400. The microprocessor first performs the calibration mode 60, then the capture mode 62 and then the docking mode 400. Once the aircraft 12 is docked, the program finishes. These modes are described in greater detail as follows:

Calibration Mode

Figure 5:
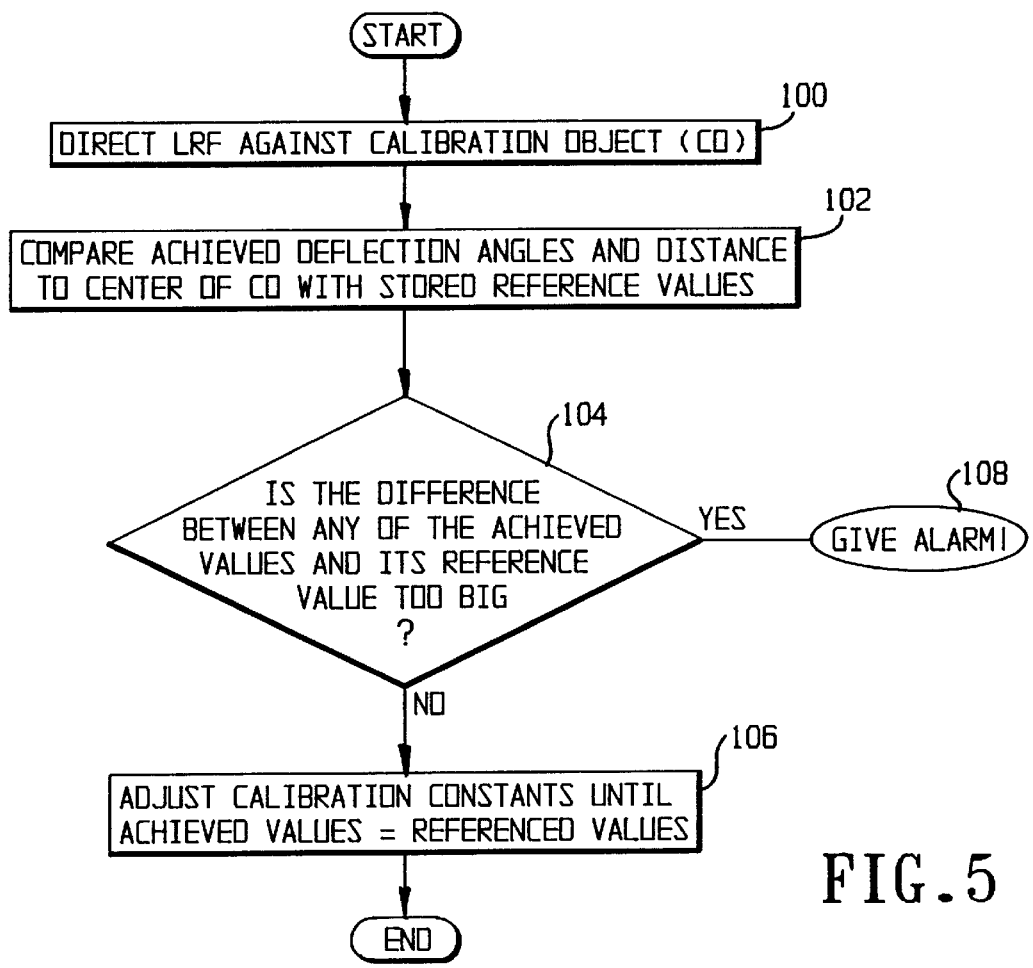
FIG. 5 is a flow chart illustrating the calibration mode of the system.
Figure 7:
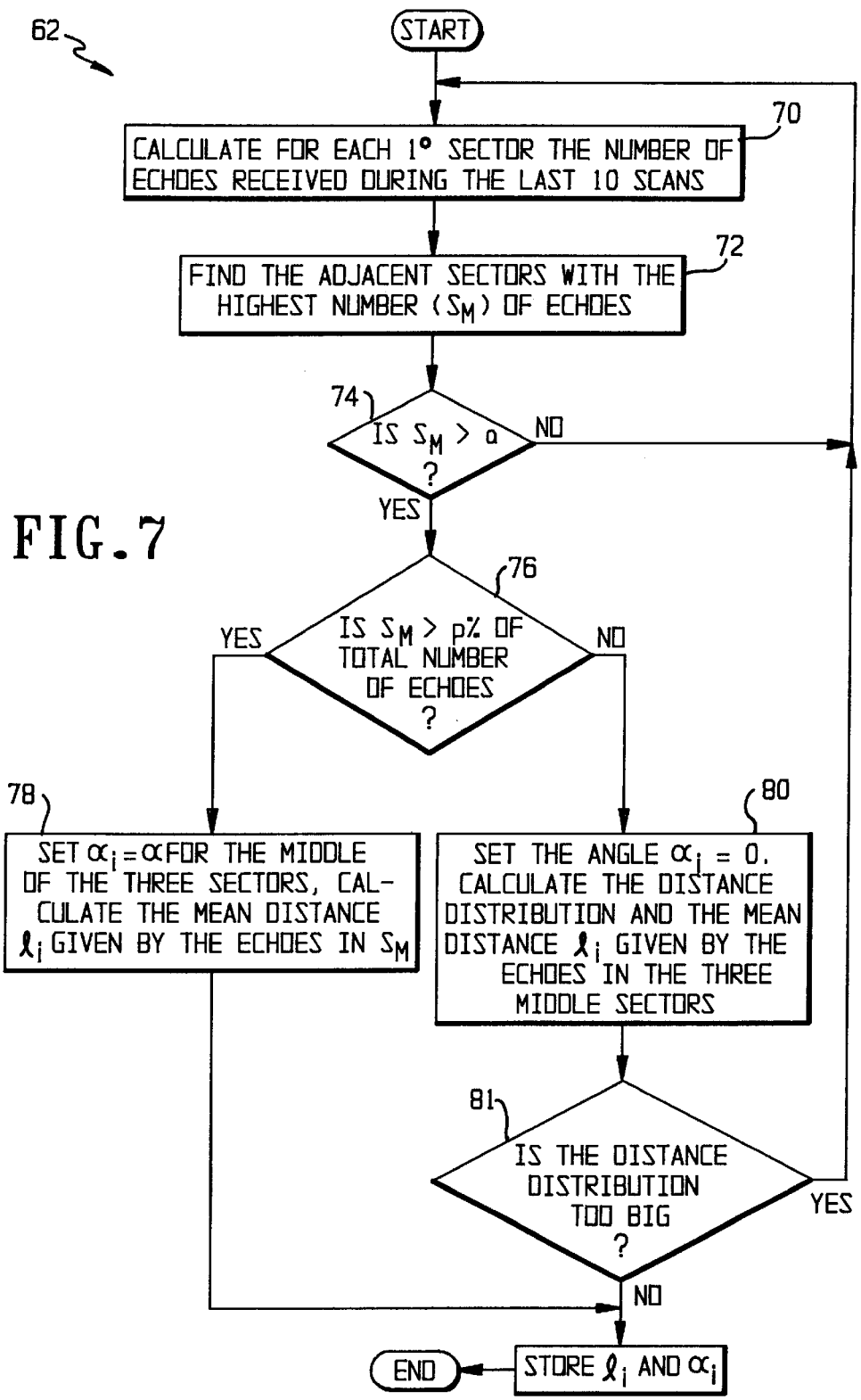
FIG. 7 is a flow chart illustrating the capture mode of the system.

To ensure system accuracy, the microprocessor 26 is programmed to calibrate itself in accordance with the procedure illustrated in FIG. 5 before capturing an aircraft 12 and at various intervals during tracking. Calibrating the system 10 ensures that the relationship between the step motors 24, 25 and the aiming direction is known. The length measuring ability of the LRF 20 is also checked.

Figure 6:
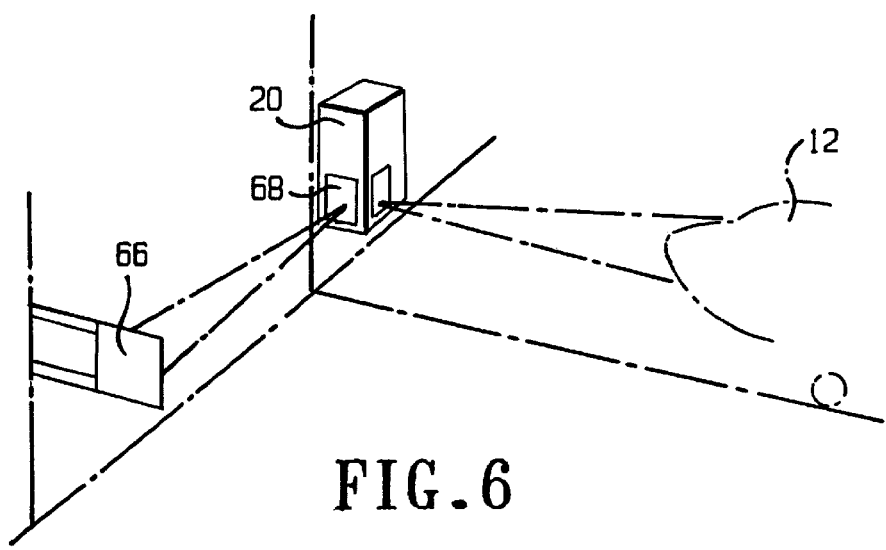
FIG. 6 is a view illustrating the components of the calibration mode.

Referring to FIG. 6, for calibration, the system 10 uses a square plate 66 with a known position. The plate 66 is mounted 6 meters from the LRF 20 and at the same height as the LRF 20.

To calibrate, the system sets $(\alpha, \beta)$ to (0,0), causing the laser to be directed straight forward. The vertical mirror 22 is then tilted such that the laser beam is directed backwards to a rear or extra mirror 68 which redirects the beam to the calibration plate 66. (100) The microprocessor 26 then uses the step motors 24, 25, to move the mirrors 21, 22 until it finds the center of the calibration plate 66. Once it finds the center of the calibration plate 66, the microprocessor 26 stores the angles $(\alpha_{cp}, \beta_{cp})$ at that point and compares them to stored expected angles. (102) The system 10 also compares the reported distance to the plate 66 center with a stored expected value. (102) If the reported values do not match the stored values, the microprocessor 26 changes the calibration constants, which determine the expected values, until they do. (104, 106) However, if any of these values deviate too much from the values stored at installation, an alarm is given. (108)

Capture Mode

Initially, the airport tower 14 notifies the system 10 to expect an incoming airplane 12 and the type of airplane to expect. This signal puts the software into a capture mode 62 as outlined in FIG. 7. In capture mode 62, the microprocessor 26 uses the step motors 24, 25 to direct the laser to scan the capture zone 50 horizontally for the plane 12. This horizontal scan is done at a vertical angle corresponding to the height of the nose of the expected type of aircraft at the midpoint of the capture zone 50.

To determine the correct height to scan, the microprocessor 26 computes the vertical angle for the laser pulse as:

$$\beta_f = \arctan[(H-h)/l_f]$$

where H=the height of the LRF 20 above the ground, h=the nose height of the expected aircraft, and $l_f$=the distance from the LRF 20 to the middle of the capture zone 50. This equation results in a vertical angle for the mirror 21 that will enable the search to be at the correct height at the middle of the capture zone 50 for the expected airplane 12.

Alternatively, the system 10 can store in the database values for $\beta_f$ for different types of aircraft at a certain distance. However, storing $\beta_f$ limits the flexibility of the system 10 because it can capture an aircraft 12 only a single distance from the LRF 20

In the capture zone 50 and using this vertical angle, the microprocessor 26 directs the laser to scan horizontally in pulses approximately 0.1 degree apart. The microprocessor 26 scans horizontally by varying a, the horizontal angle from a center line starting from the LRF 20, between $\pm\alpha_{max}$, a value defined at installation. Typically, $\alpha_{max}$ is set to 50 which, using 0.1 degree pulses, is equivalent to 5 degrees and results in a 10 degree scan.

The release of the laser pulses results in echoes or reflections from objects in the capture zone 50. The detection device of the LRF 20 captures the reflected pulses, computes the distance to the object from the time between pulse transmission and receipt of the echo, and sends the calculated distance value for each echo to the microprocessor 26. The micro processor 26 stores, in separate registers in a data storage device, the total number of echoes or hits in each 1 degree sector of the capture zone 50. (70) Because the pulses are generated in 0.1 degree intervals, up to ten echoes can occur in each sector. The microprocessor 26 stores these hits in variables entitled $s_\alpha$ where a varies from 1 to 10 to reflect each one degree slice of the ten degree capture zone 50.

In addition to storing the number of hits per sector, the microprocessor 26 stores, again in a data storage device, the distance from the LRF 20 to the object for each hit or echo. Storing the distance to each reflection requires a storage medium large enough to store up to ten hits in each 1 degree of the capture zone 50 or up to 100 possible values. Because, in many cases, most of the entries will be empty, well known programming techniques an reduce these storage requirements below having 100 registers always allocated for these values.

Once this data is available for a scan, the microprocessor 26 computes the total number of echoes, $S_T$, in the scan by summing the $s_\alpha$'s. The microprocessor 26 then computes $S_M$, the largest sum of echoes in three adjacent sectors. (72) In other words, $S_M$ is the largest sum of $(S_{\alpha-1}, S_\alpha, S_{\alpha+1})$.

Once it computes $S_M$ and $S_T$, the microprocessor 26 determines whether the echoes are from an incoming airplane 12. If $S_M$ is not greater than 24, no airplane 12 has been found and the microprocessor 26 returns to the beginning of the capture mode 62. If the largest sum of echoes, $S_M$ is greater than 24 (74), a "possible" airplane 12 has been located. If a "possible" airplane 12 has been located, the microprocessor checks if $S_M/S_T$ is greater than 0.5 (76), or the three adjacent sectors with the largest sum contain at least half of all the echoes received during the scan.

If $S_M/S_M$ is greater than 0.5, the microprocessor 26 calculates the location of the center of the echo. (78, 82) The angular location of the center of the echo is calculated as:

$$\alpha_1=\alpha_v+(S_{\alpha+1}-S_{\alpha-1})/(S_{\alpha-2}+S_\alpha+S_{\alpha+1})$$

where $S_\alpha$ is the $S_\alpha$ that gave $S_M$ and $\alpha_v$ is the angular sector that corresponds to that $S_\alpha$.

The longitudinal position of the center of the echo is calculated as $$l_t = \frac{1}{n}\sum_{i=1}^{10} l_{avi}$$

where the $l_{avi}$ are the measured values, or distances to the object, for the pulses that returned an echo from the sector $\alpha_v$ and where n is the total number of measured values in this sector. (78, 82) Because the largest possible number of measured values is ten, n must be less than or equal to ten.

However, if $S_M/S_T<0.5$, the echoes may have been caused by snow or other aircraft at close range. If the cause is an aircraft at close range, that aircraft is probably positioned fairly close to the centerline so it is assumed that at should be zero instead of the above calculated value and that It should be the mean distance given by the three middle sectors. (80) If the distance distribution is too large, the microprocessor 26 has not found an airplane 12 and it returns to the beginning of the capture mode 62. (81).

After calculating the position of the aircraft 12, the system 10 switches to docking mode 400.

Docking Mode

The docking mode 400 illustrated in FIGS. 4A and 4B includes four phases, the tracking phase 84, the height measuring phase 86, the profile recognition phase 404, and the aircraft criteria phase 408. In the tracking phase 84, the system 10 monitors the position of the incoming aircraft 12 and provides the pilot with information about axial location 31 and distance from the stopping point 53 of the plane through the display 18. The system 10 begins tracking the aircraft 12 by scanning horizontally.

Figure 8:
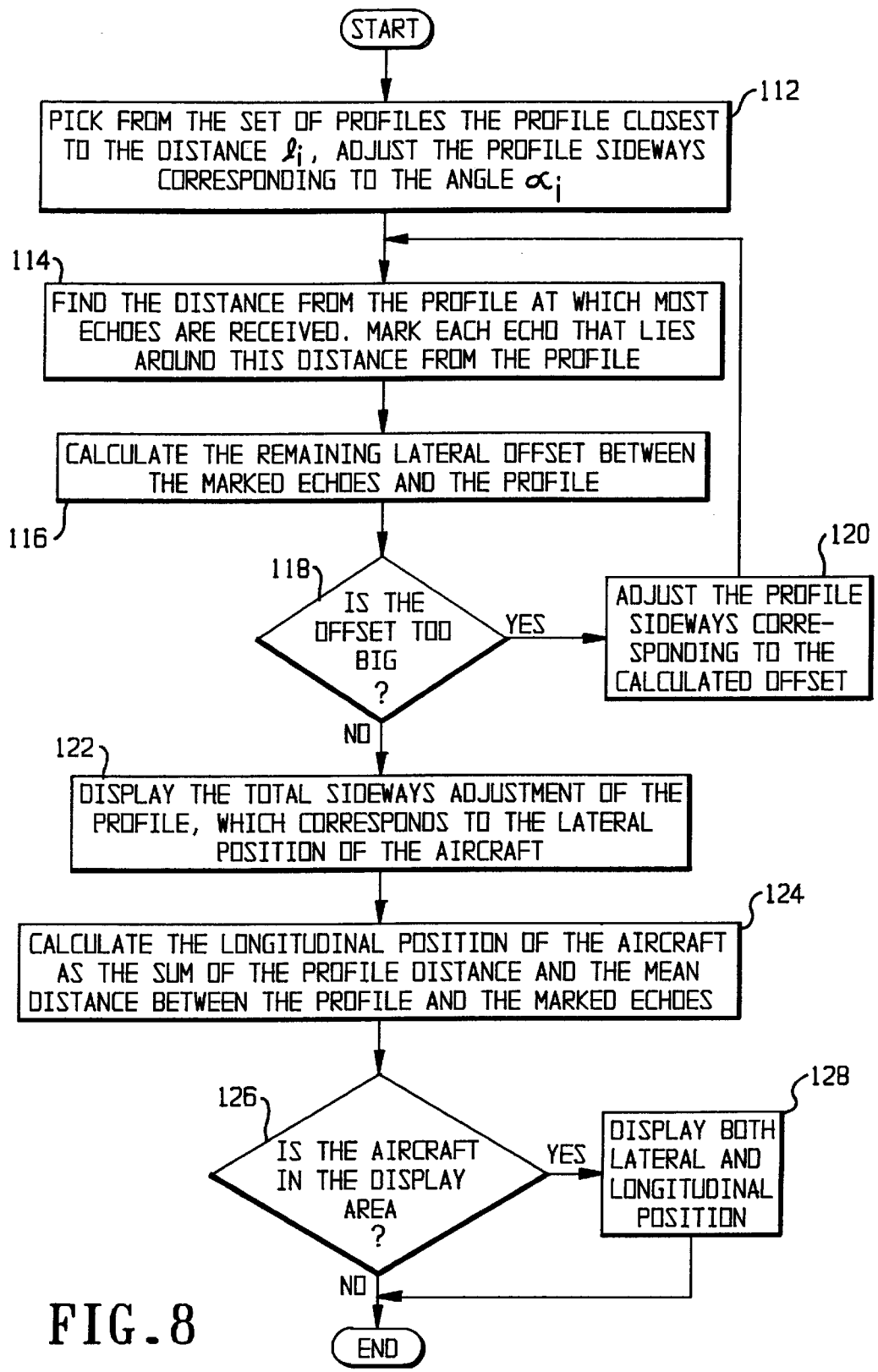
FIG. 8 is a flow chart illustrating the tracking phase of the system.

Referring to FIG. 8, during the first scan in tracing phase, the microprocessor 26 directs the LRF 20 to send out laser pulses in single angular steps, α or, preferably, at 0.1 degree intervals between ($\alpha_1-\alpha_P-10$) and ($\alpha_1+\alpha_P+10$), where $\alpha_1$ is determined during the capture mode 62 as the angular position of the echo center and $\alpha_P$ is the largest angular position in the current profile column that contains distance values.

After the first scan, a is stepped back and forth with one step per received LRF value between ($\alpha_S-\alpha_P-10$) and ($\alpha_1+\alpha_P+10$), where $\alpha_l$ is the angular position of the azimuth determined during the previous scan.

During the tracking phase 84, the vertical angle β is set to the level required for the identified craft 12 at its current distance from the LRF 20 which is obtained from the reference profile Table I. The current profile column is the column representing a position less than but closer to $l_r$.

The microprocessor 26 uses the distance from the stopping point 53 to find the vertical angle for the airplane's current distance on the profile Table I. During the first scan, the distance, It, calculated during the capture mode 62, determines the appropriate column of the profile Table I and thus the angle to the aircraft 12. For each subsequent scan, the microprocessor 26 uses the β in the column of the profile Table I reflecting the present distance from the stopping point 53. (112)

Using the data from the scans and the data on the horizontal profile Table I, the microprocessor 26 creates a Comparison Table II. The Comparison Table II is a two dimensional table with the number of the pulse, or angular step number, as the index 91, i, to the rows. Using this index, the following information, represented as columns of the table, can be accessed for each row: $l_i$ 92, the measured distance to the object on this angular step; $l_k$ 93, the measured value compensated for the skew caused by the displacement (equal to $l_i$ minus the quality $s_m$, the total displacement during the last scan, minus the quality i times $s_p$, the average displacement during each step in the last scan, i.e., $l_i-(s_m-is_p)$); $d_i$ 94, the distance between the generated profile and the reference profile (equal to $r_{ij}$, the profile value for the corresponding angle at the profile distance j minus $I_{ki}$); $a_i$, 95, the distance the nose of the aircraft and the measuring equipment (equal to $r_{j50}$, the reference profile value at zero degrees, minus $d_i$); $a_e$ 96, the estimated nose distance after each step (equal to $a_m$, the nose distance at the end of the last scan, minus the quantity i times $s_p$); $a_d$, the difference between the estimated and measured nose distance (equal to the absolute value of $a_i$ minus $a_c$); and Note 97 which indicates the echoes that are likely caused by an aircraft.

During the first scan in the tracking phase 84, the system 10 uses the horizontal profile column representing an aircraft position, j, less than but closest to the value of $I_r$. For each new scan, the profile column whose value is less than but closest to $(a_m-s_m)$ is chosen where $a_m$ is the last measured distance to the aircraft 12 and $s_m$ is the aircraft's displacement during the last scan. Additionally, the values of the profile are shifted sideways by $\alpha_s$ to compensate for the lateral position of the aircraft. (112)

During each scan, the microprocessor 26 also generates a Distance Distribution Table (DDT). This table contains the distribution of a $s_i$ value as they appear in the Comparison Table II. Thus, the DDT has an entry representing the number of occurrences of each value of $a_i$ in the Comparison Table II in 1 meter increments between 10 to 100 meters.

After every scan, the system 10 uses the DDT to calculate the average distance am, to the correct stopping point 53. The microprocessor 26 scans the data in the DDT to find the two adjacent entries in the DDT for which the sum of their values is the largest. The microprocessor 26 then flags the Note 97 column in the Comparison Table II for each row containing an entry for $a_i$ corresponding to either of the two DDT rows having the largest sum. (114)

The system 10 then determines the lateral deviation of offset. (116) The microprocessor 26 first sets:

$$2d=\alpha_{max}-\alpha_{min}$$

where $\alpha_{max}$ and $\alpha_{min}$ are the highest and lowest a values for a continuous flagged block of $d_j$ values in the Comparison Table II. Additionally, the microprocessor 26 calculates:

$$Y_1 \Sigma d_i$$

for the upper half of the flagged $d_j$ in the block and:

$$Y2=\Sigma d_i$$

for the lower half of the block. Using $Y_1$ and $Y_2$ "a" 116 is calculated as:

$$a-kx(Y_1-Y_2)/d^2$$

where k is given in the reference profile. If "a" exceeds a given value, preferably set to one, it is assumed that there is a lateral deviation approximately equal to "a". The II column of the Comparison Table II is then shifted "a" steps and the Comparison Table II is recalculated. The process continues until "a" is smaller than an empirically established value, preferably one. The total shift, $\alpha_s$, of the $l_i$ column is considered equal to the lateral deviation or offset. (116) If the lateral offset is larger than a predetermined value, preferably set to one, the profile is adjusted sideways before the next scan. (118, 120)

After the lateral offset is checked, the microprocessor 26 provides the total sideways adjustment of the profile, which corresponds to the lateral position 31 of the aircraft 12, on the display 18. (122)

The microprocessor 26 next calculates the distance to the nose of the aircraft, $a_m$ $$a_m = \Sigma(\text{flagged } a_i)/N$$

where N is the total number of flagged $a_i$. From $a_m$, the microprocessor 26 can calculate the distance from the plane 12 to the stopping point 53 by subtracting the distance from the LRF 20 to the stopping point 53 from the distance of the nose of the aircraft. (124)

Once it calculates the distance to the stopping point 53, the microprocessor 26 calculates the average displacement during the last scan, $S_m$. The displacement during the last scan is calculated as:

$$S_m = a_{m-1} - a_m$$

where $a_{m-1}$ and $a_m$ belong to the last two scans. For the first scan in tracking phase 84, $S_m$ is set to 0.

The average displacement during each step is calculated as:

$$S_p = S_m/P$$

where P is the total number of steps for the last scan cycle.

The microprocessor 26 will inform the pilot of the distance to the stopping position 53 by displaying it on the display unit 18, 29. By displaying the distance to the stopping position 29, 53 after each scan, the pilot receives constantly updated information in real time about how far the plane 12 is from stopping.

If the aircraft 12 is in the display area 52, both the lateral 31 and the longitudinal position 29 are provided on the display 18. (126, 128) Once the microprocessor 26 displays the position of the aircraft 12, the tracking phase ends.

Once it completes the tracking phase, the microprocessor 26 verifies that tracking has not been lost by checking that the total number of rows flagged divided by the total number of measured values, or echoes, in the last scan is greater than 0.5. (83) In other words, if more that 50% of the echoes do not correspond to the reference profile, tracking is lost. If tracking is lost and the aircraft 12 is greater than 12 meters from the stopping point, the system 10 returns to the capture mode 62. (85) If tracking is lost and the aircraft 12 is less than or equal to 12 meters from the stopping point 53, the system 10 turns on the stop sign to inform the pilot that it has lost tracking. (85, 87)

If tracking is not lost, the microprocessor 26 determines if the nose height has been determined. (13) If the height has not yet been determined, the microprocessor 26 enters the height measuring phase 86. If the height has already been determined, the microprocessor 26 checks to see if the profile has been determined (402).

Figure 9:
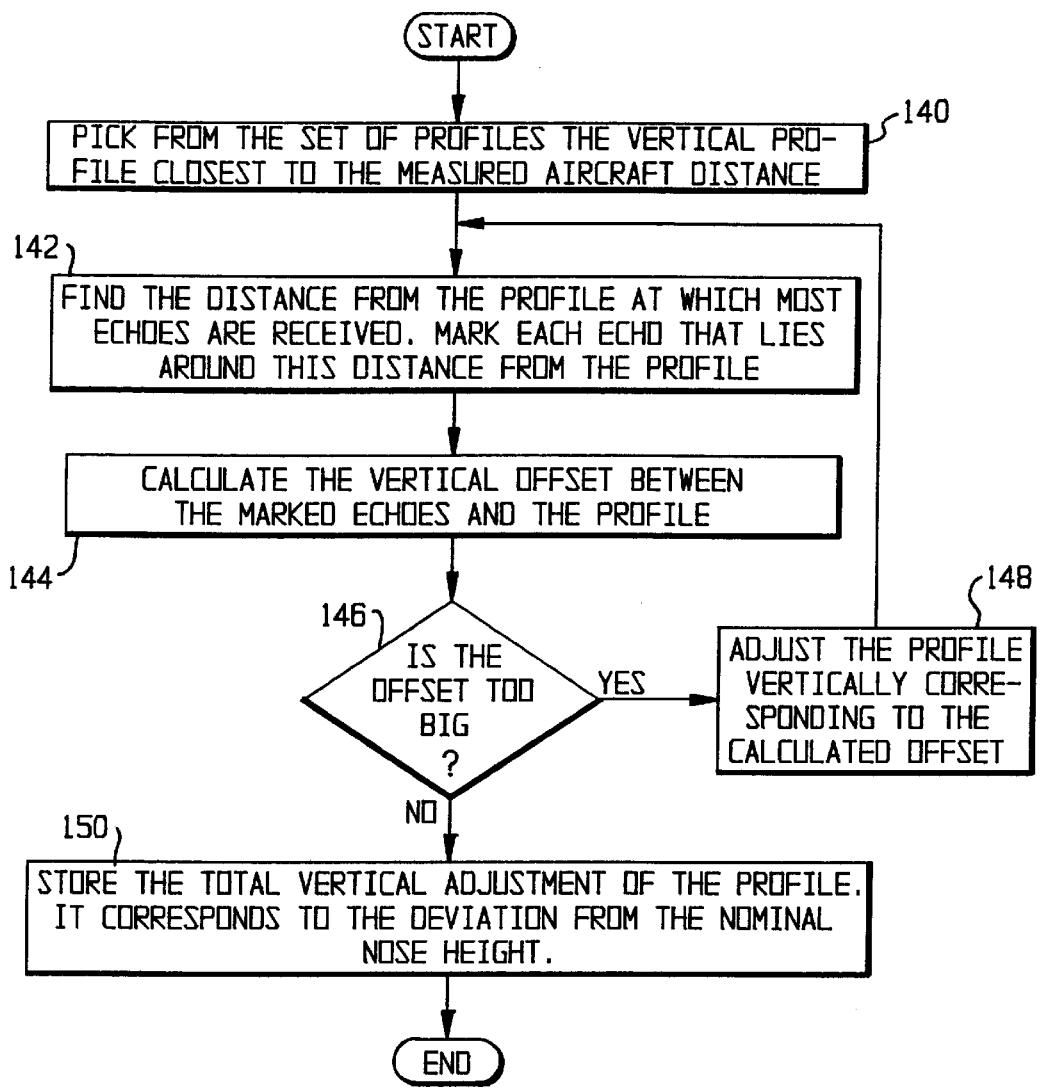
FIG. 9 a is flow chart illustrating the height measuring the phase of the system.

In the height measuring phase, illustrated in FIG. 9, the microprocessor 26 determines the nose height by directing the LRF 20 to scan vertically. The nose height is used by the system to ensure that the horizontal scans are made across the tip of the nose.

To check the nose height, the microprocessor 26 sets $\beta$ to a predetermined value $\beta_{max}$ and then steps it down in 0.1 degree intervals once per received/reflected pulse until it reaches $\beta_{min}$, another predetermined value. $\beta_{min}$ and $\beta_{max}$ are set during installation and typically are −20 and 30 degrees respectively. After $\beta$ reaches $\beta_{min}$ the microprocessor 26 directs the step motors, 24, 25 up until it reaches $\beta_{max}$. This vertical scanning is done with a set to $\alpha_s$, the azimuth position of the previous scan.

Using the measured aircraft distance, the microprocessor 26 selects the column in the vertical profile table closest to the measured distance. (140) Using the data from the scan and the data on the vertical profile table, the microprocessor 26 creates a comparison table shown herein as Table II. Table II is a two dimensional table with the number of the pulse, or angular step number, as an index 91, i, to the rows. Using this index, the following information, represented as columns of the table, can be accessed for each row: $l_i$ 92, the measured distance to the object on this angular step, $l_{ki}$ 93, the measured value compensated for the skew caused by the displacement (equal to $l_i$ minus the quantity $S_m$, the total displacement during the last scan, minus the quantity i times $S_p$, the average displacement during each step in the last scan), $d_i$ 94, the distance between the generated profile and the reference profile (equal to $r_{ij}$, the profile value for the corresponding angle at the profile distance j, minus $i_{ki}$), $a_i$ 95, the distance between the nose of the aircraft and the measuring equipment equal to $r_{j50}$, the reference profile value at zero degrees, minus $d_i$), $a_e$ 96, the estimated nose distance after each step (equal to $a_m$, the nose distance at the end of the last scan, minus the quantity i times $S_p$), $a_d$, the difference between the estimated and measured nose distance (equal to the absolute value of $a_i$ minus $a_e$), and Note 97 which indicates echoes that are likely caused by an aircraft 12.

During each scan the microprocessor 26 also generates a Distance Distribution Table (DDT). This table contains the distribution of $a_i$ values as they appear in Table II. Thus, the DDT has an entry representing the number of occurrences of each value of $a_i$ in Table II in 1 meter increments between 10 to 100 meters.

After every scan, the system 10 uses the DDT to calculate the average distance, $a_m$, to the correct stopping point 53. The microprocessor 26 scans the data in the DDT to find the two adjacent entries in the DDT for which the sum of their values is the largest. The microprocessor 26 then flags the Note 97 column in Table II for each row containing an entry for $a_i$ corresponding to either of the two DDT rows having the largest sum. (142)

Once it completes the calculation of the average distance to the correct stopping point 53, the microprocessor 26 calculates the average displacement during the last scan, $s_m$. The displacement during the last scan is calculated as:

$$S_m = a_{m-1} - a_m$$

where $a_{m-1}$ and $a_m$ belong to the last two scans. For the first scan in tracking phase 84, $s_m$ is set to 0. The average displacement $s_p$ during each step is calculated as:

$$s_p = s_m/P$$

where P is the total number of steps for the last scan cycle.

Calculating the actual nose height is done by adding the nominal nose height, predetermined height of the expected aircraft when empty, to the vertical or height deviation. Consequently, to determine the nose height, the system 10 first determines the vertical or height deviation. (144) Vertical deviation is calculated by setting:

$$2d = \beta_{max} - \beta_{min}$$

where $\beta_{max}$ and $\beta_{min}$ are the highest and lowest P value for a continuous flagged block of $d_i$ values in the Comparison Table II. Additionally, the microprocessor 26 calculates:

$$Y_1 = \Sigma d_i$$

for the upper half of the flagged $d_i$ in the block and;

$$Y_2 = \Sigma d_i$$

for the lower half of the block. Using $Y_1$ and $Y_2$, "a" is calculated as $$a = k \times (Y_1 - Y_2)/d^2$$

where k is given in the reference profile. If "a" exceeds a given value, preferably one, it is assumed that there is a vertical deviation approximately equal to "a". The $l_i$ column is then shifted "a" steps, the Comparison Table II is re-screened and "a" recalculated. This process continues until "a" is smaller than the given value, preferably one. The total shift, $\beta_S$ of the $l_i$ column is considered equal to the height deviation. (144) The $\beta_j$ values in the vertical Comparison Table II are then adjusted as $\beta_j + \Delta\beta_j$, where the height deviation $\Delta\beta_j$ is:

$$\Delta\beta_j = \beta_s \times (a_{m\beta} + a_s)/(a_j + a_s)$$

and where $a_{m\beta}$ is the valid $a_m$ value when $\beta_s$ was calculated.

Once the height deviation is determined, the microprocessor 26 checks if it is bigger than a predetermined value, preferably one. (146) If the deviation is larger than that value, the microprocessor 26 adjusts the profile vertically corresponding to that offset. (148) The microprocessor 26 stores the vertical adjustment as the deviation from the nominal nose height. (150) The actual height of the aircraft is the nominal nose height plus the deviation.

Figure 10:
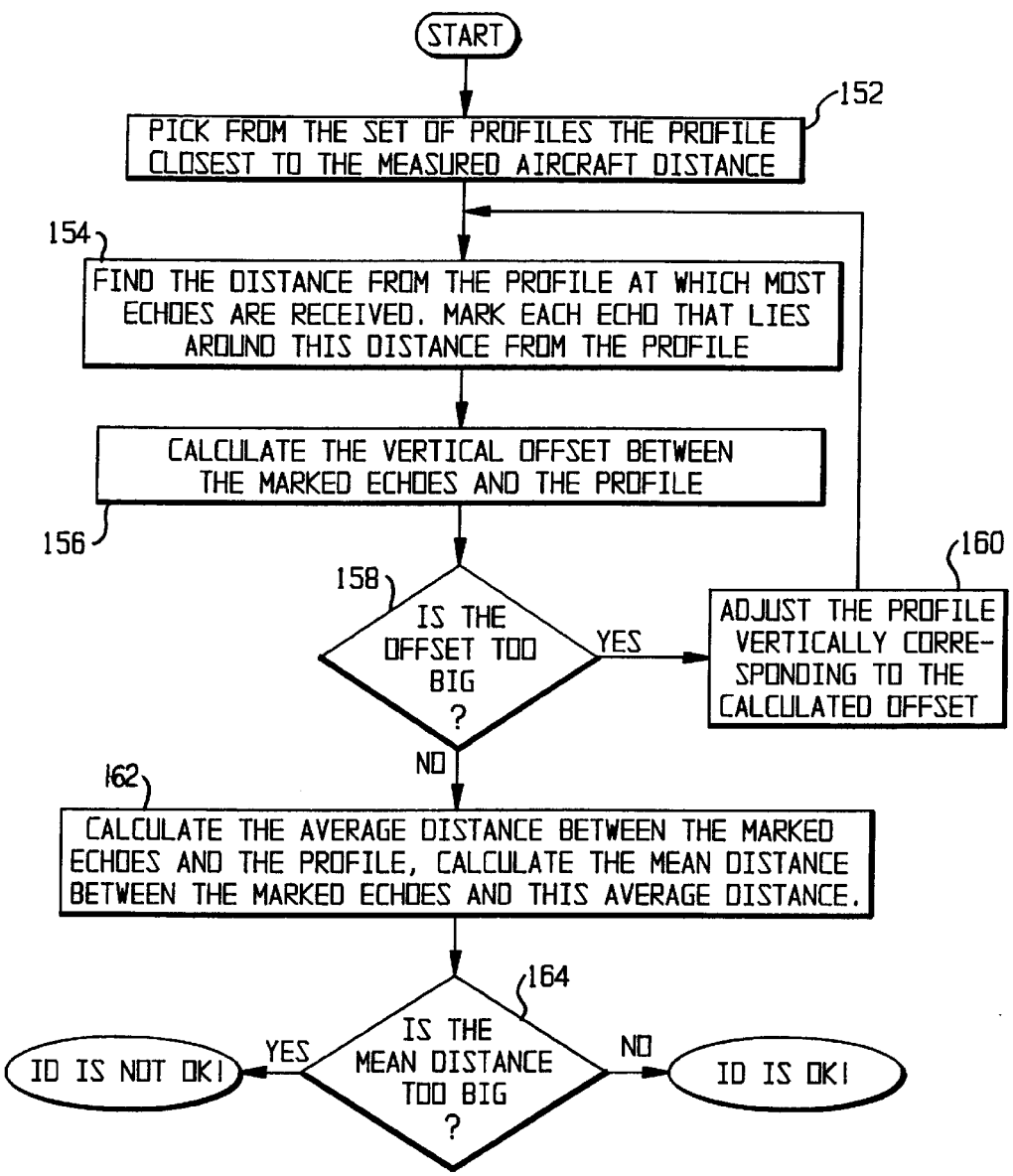
FIG. 10 is a flow chart illustrating the identification phase of the system.

If the nose height is determined, or once the height measuring phase 86 is run, the microprocessor 26 enters the identification phase illustrated in FIG. 10. (133, 88) In the identification phase 88, the microprocessor 26 creates a Comparison Table II to reflect the results 20 of another vertical scan and the contents of the profile table. (152, 154). Another vertical scan is performed in the identification phase 88 because the previous scan may have provided sufficient data for height determination but not enough for identification. In fact, several scans may need to be done before a positive identification can be made. After calculating the vertical offset 156, checking that it is not too large (158) and adjusting the profile vertically corresponding to the offset (160) until the offset drops below a given amount, preferably one, the microprocessor 26 calculates the average distance between marked echoes and the profile and the mean distance between the marked echoes and this average distance. (162)

The average distance $d_m$ between the measured and corrected profile and the deviation T from this average distance are calculated after vertical and horizontal scans as follows:

$$d_m = \Sigma d_i/N$$

$$T = \Sigma |d_i - d_m|/N$$

If T is less than a given value, preferably 5, for both profiles, the aircraft 12 is judged to be of the correct type provided that a sufficient number of echoes are received. (164) Whether a sufficient number of echoes is received is based on:

$$N/\text{size} > 0.75$$

where N is the number of "accepted" echoes and "size" is the maximum number of values possible. If the aircraft 12 is not of the correct type, the microprocessor turns on the stop sign 136 and suspends the docking mode 400.

Figure 11:
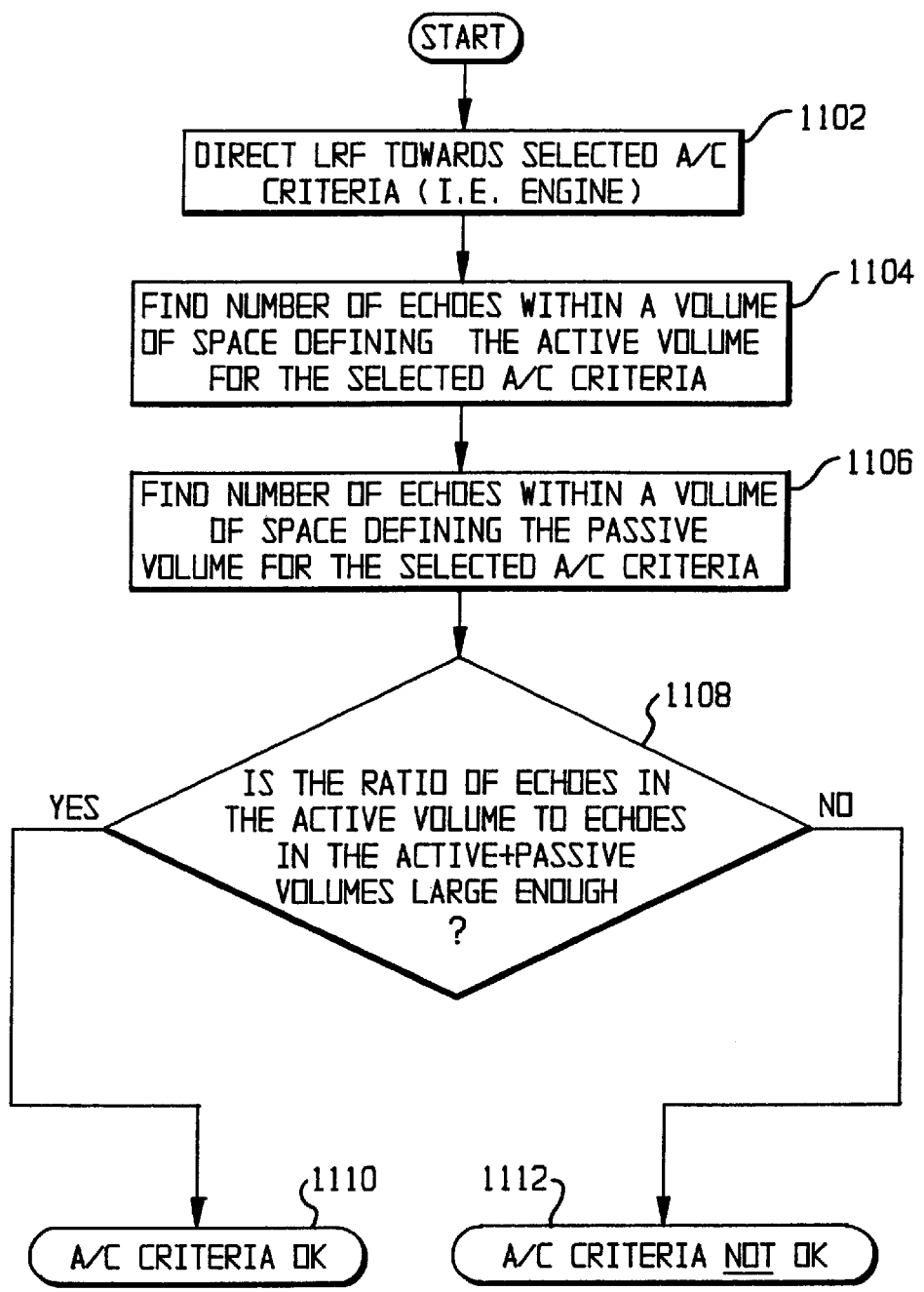
FIG. 11 is a flow chart illustrating the aircraft criterion phase of the system.
Figure 12:
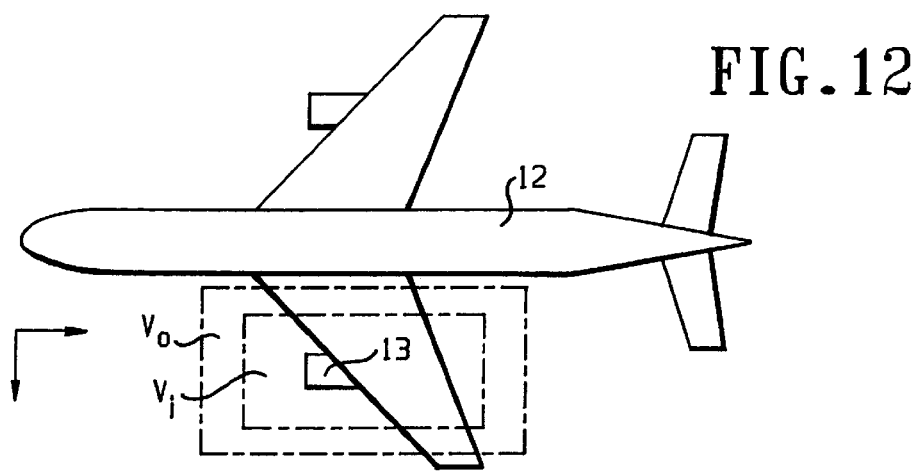
FIG. 12 is a diagram showing inner and outer volumes around an aircraft engine used in the aircraft criterion phase.

If the profile is determined (402), or once the profile determination phase is run (404), the microprocessor 26 determines whether the aircraft criterion is determined (406). If not, the aircraft criterion phase 408, which is illustrated in FIGS. 11 and 12, is run.

In order for the criterion to be fulfilled, echoes must be returned from the location where there is an engine on the expected aircraft. As there is some measurement uncertainty, there might be echoes that actually come from the engine but appear to come from outside the engine. Therefore, there must be defined a space Vi, called the inner volume or the active volume, around the engine, such that echoes from within Vi are considered to come from the engine. FIG. 12 shows a sample Vi around an engine 13 of an airplane 12.

An engine is characterized in that for a horizontal scan there is a reflecting surface surrounded by free space. In order to be able to discriminate between an engine and, e.g., a wing, there must be defined another space Vo around the engine where there must be no or very few echoes. The space Vo is called the outer volume or the passive volume. FIG. 12 also shows a sample Vo around Vi.

The engine is defined by its coordinates (dx, dy, dz) for the center of the engine front relative to the nose and by its diameter D. These parameters are stored in a database for all aircraft types.

Vi and Vo are defined by the extension sideways (x-direction) and lengthwise (z-direction) from this engine center. The vertical position of the engine is given as (nose height +dy).

For an engine on the wing, Vi and Vo are defined by the following ranges of coordinates:

Vi:
   x-direction: ±(D/2+1 m)
   z-direction: ±3 m, −1 m

Vo:
   x-direction: +2 m from Vi
   z-direction: ±1.5 m from Vi

For tail engines the definition is the same except for Vo in the x-direction, which is given by +2 m from Vi. Otherwise echoes from the fuselage could fall within Vo and the criterion would not be fulfilled.

Finally, the criterion is $$Vi/(Vi+Vo) > 0.7$$

The threshold value 0.7 in the criterion is determined empirically. So are the limits given above for Vi and Vo. At the moment these values are chosen so that unnecessary ID failures are avoided and they are different only dependent on if the engine is on the wing or on the tail. As docking data is accumulated they will be adjusted, probably different for different aircraft types, to achieve better and better discrimination.

The aircraft criteria phase 408 applies the above principles as shown in the flow chart of FIG. 11. When the aircraft criteria phase starts, the LRF is directed toward the engine or other selected aircraft criterion in step 1102. In step 1104, the number of echoes in Vi is found, and in step 1106, the number of echoes in Vo is found. In step 1108, it is determined whether Vi/(Vi+Vo) exceeds the threshold value. If so, the aircraft criterion is indicated as met (OK) in step 1110. Otherwise, the aircraft criterion is indicated as unmet (not OK) in step 1112.

If the aircraft criterion has been determined (406), or once the aircraft criterion phase is complete (408), the microprocessor 26 determines whether the aircraft 12 has been identified. (410). If the aircraft 12 has been identified, the microprocessor 26 checks whether the aircraft 12 has reached the stop position. (412). If the stop position is reached, the microprocessor 26 turns on the stop sign, whereupon the system 10 has completed the docking mode 400. (414) If the aircraft 12 has not reached the stop position, the microprocessor 26 returns to the tracking phase 84.

If the aircraft 12 is not identified, the microprocessor 26 checks whether the aircraft 12 is less than or equal to 12 meters from the stopping position 53. (416) If the aircraft 12 is not more than 12 meters from the stopping position 53, the system 10 turns on the stop sign to inform the pilot that the identification has failed. (418) After displaying the stop sign, the system 10 shuts down.

If the aircraft 12 is more than 12 meters from the stopping point 53, the microprocessor 26 returns to the tracking phase 84.

In one possible implementation, the nominal distance from the nose to the engine is used as the aircraft criterion. In that implementation, docking is stopped if the nose-to-engine distance, as measured in step 408, is more than two meters shorter than that for the expected aircraft. If the difference is within two meters, it may still be possible to accept an aircraft of the wrong type safely. In the latter case, if the safety margin between the engine and a structure of the airport gate is three meters for the correct type of aircraft, the safety margin for the other type of aircraft is still at least one meter. Tests have shown that the engine position can be located to within about 1 meter and that the nose height can be determined to within ±0.5 meter.

Figure 13:
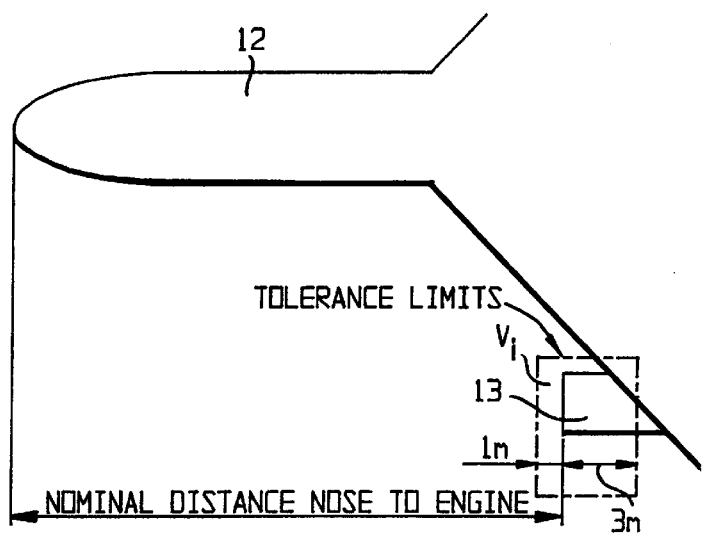
FIG. 13 is a diagram showing the tolerance limits of the measured nose-to-engine distance for accepting an aircraft into a gate.

FIG. 13 shows the nominal nose to engine distance of an aircraft 12. The distance from the aircraft's nose to its engine 13 is of particular concern, since the engine 13 is in such a position that misidentification can result in a collision between the engine 13 and a component of the gate. Also shown are forward and backward tolerance limits for the position of the engine 13 that define the forward and backward extents of Vi.

Figure 14:
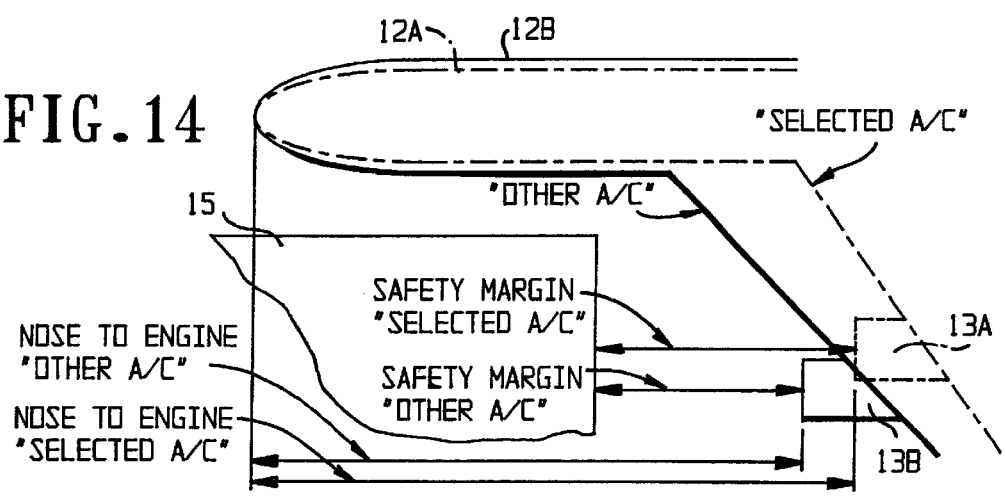
FIG. 14 is a diagram showing the dependence of the safety margin on the nose-to-engine distance in a situation in which an aircraft of the wrong type is docked at the gate.

FIG. 14 shows an application of the identification procedure described above and in particular shows what may happen if the system is set up for a selected aircraft 12A, but another aircraft 12B attempts to dock at that gate. If a type of aircraft 12B different from the selected aircraft 12A is accepted into the gate, the aircraft 12B will be stopped with the nose in the same position in which the nose of the selected aircraft 12A would be stopped. As a result, the safety margin, which is the distance from the engine to the closest component of the gate, such as the bridge 15, is different between the aircraft 12A and 12B if the nose-to-engine distances of those aircraft are different. As can be seen from FIG. 14, the safety margin for the aircraft 12B is equal to the safety margin for the aircraft 12A minus the difference in nose-to-engine distances. If, for example, the safety margin for the aircraft 12A is 3 m, and the nose-to-engine distance for the aircraft 12B is 3.5 m shorter than that for the aircraft 12A, the engine 13B of the aircraft 12B will collide with the bridge 15. Therefore, if all aircraft types for which the nose-to-engine distance is too small in comparison with that for the selected aircraft 12A are stopped, i.e., not accepted into the gate, the safety margin can always be kept at an acceptable level.

While a preferred embodiment of the present invention has been set forth in detail above, those skilled in the art will readily appreciate that other embodiments can be realized within the scope of the invention. For example, while the aircraft criterion phase 408 is disclosed as using the ratio Vi/(Vi+Vo), the difference Vi−Vo could be used instead. Also, the specific numerical ranges disclosed above should be considered to be illustrative rather than limiting. Those skilled in the art will be able to derive other numerical ranges as needed to adapt the invention to other models of aircraft or to the specific needs of various airports. Therefore, the present invention should be construed as limited only by the appended claims.

TABLE I

|   |   | 41) |   |   |   |
|---|---|-----|---|---|---|
| 42 ∼78.25 | 78 | 77.5 | ... | 23 |
| 44 ∼5 | 5 | 5.6 | ... | 10 |
| 45 ∼1 | 2 | 3 | ... | 50 |
| 0 | xx | xx | xx | ... | xx |
| 1 | xx | xx | xx | ... | xx |
| 2 | xx | xx | xx | ... | xx |
| 3 | xx | xx | xx | ... | xx |
| 4 | xx | xx | xx | ... | xx |
| 10 ∼5 | xx | xx | xx | ... | xx |
| 6 | xx | xx | xx | ... | xx |
| 7 | xx | xx | xx | ... | xx |
| 8 | xx | xx | xx | ... | xx |
| 9 | xx | xx | xx | ... | xx |
| . |   |   |   |   |   |
| . |   |   |   |   |   |
| . |   |   |   |   |   |
| 50 | xx | xx | xx | ... 43 | xx |

TABLE II

| i | $l_i$ | $l_{ki}$ | $d_i$ | $a_i$ | $a_e$ | Note |
|---|---|---|---|---|---|---|
| 1 | xx | xx | xx | xx | xx | xx |
| 2 | xx | xx | xx | xx | xx | xx |
| 3 | xx | xx | xx | xx | xx | xx |
| 4 | xx | xx | xx | xx | xx | xx |
| 5 | xx | xx | xx | xx | xx | xx |
| 6 | xx | xx | xx | xx | xx | xx |
| . | | | | | | |
| 50 | xx | xx | xx | xx | xx | xx |
| . | | | | | | |
| 100 | xx | xx | xx | xx | xx | xx |

(Column headers numbered: 91, 92, 93, 94, 95, 96, 97)

What is claimed is:

1. A system for determining whether a detected object is a known object, the known object having a known profile and also having a known feature at a known location, the system comprising:

projecting means for projecting light pulses onto the detected object;

collecting means for collecting light pulses reflected off the detected object and for detecting a shape of the detected object in accordance with the light pulses;

comparing means for comparing the detected shape with a profile corresponding to the known shape and for determining whether the detected shape corresponds to the known shape; and identifying means for identifying whether the detected object is the known object by determining whether the detected object has the known feature at the known location.

2. The system of claim 1, wherein:

for the known object, an inner volume is defined so as to contain the known feature, and an outer volume is defined so as not to contain the known feature;

the identifying means determines whether the detected object has the known feature in the known location in accordance with a number of light pulses reflected from within the inner volume and a number of light pulses reflected from within the outer volume.

3. The system of claim 2, wherein the outer volume is defined to surround the inner volume.

4. The system of claim 2, wherein the identifying means determines whether the detected object has the known feature in the known location in accordance with whether $$Vi/(Vi+Vo)>T,$$

where:

$Vi$=the number of light pulses reflected from the inner volume;

$Vo$=the number of light pulses reflected from the outer volume; and $T$=a predetermined threshold value.

5. The system of claim 4, wherein T=0.7.

6. The system of claim 2, wherein the identifying means controls the projecting means to project light pulses into the inner volume and the outer volume.

7. The system of claim 1, wherein:

the known object comprises a nose with a known nose height; and the identifying means further identifies whether the detected object is the known object by detecting a nose height of the detected object and comparing the detected nose height to the known nose height.

8. The system of claim 7, wherein the identifying means compares the detected nose height to the known nose height by taking a difference between the detected nose height and the known nose height.

9. The system of claim 8, wherein the identifying means identifies the detected object as the known object only if the difference is less than or equal to a threshold difference.

10. The system of claim 9, wherein the threshold difference is 0.5 m.

11. A method for determining whether a detected object is a known object, the known object having a known profile and also having a known feature at a known location, the method comprising:

(a) projecting light pulses onto the detected object;

(b) collecting light pulses reflected off the detected object and for detecting a shape of the detected object in accordance with the light pulses;

(c) comparing the detected shape with a profile corresponding to the known shape and for determining whether the detected shape corresponds to the known shape; and (d) identifying whether the detected object is the known object by determining whether the detected object has the known feature at the known location.

12. The method of claim 11, wherein:

for the known object, an inner volume is defined so as to contain the known feature, and an outer volume is defined so as not to contain the known feature;

said step of identifying comprises determining whether the detected object has the known feature in the known location in accordance with a number of light pulses reflected from within the inner volume and a number of light pulses reflected from within the outer volume.

13. The method of claim 12, wherein the outer volume is defined to surround the inner volume.

14. The method of claim 12, wherein said step of identifying comprises determining whether the detected object has the known feature in the known location in accordance with whether $$Vi/(Vi+Vo)>T,$$

where:

$Vi$=the number of light pulses reflected from the inner volume;

$Vo$=the number of light pulses reflected from the outer volume; and $T$=a predetermined threshold value.

15. The method of claim 14, wherein T=0.7.

16. The method of claim 12, wherein said step of identifying comprises controlling said step of projecting to project light pulses into the inner volume and the outer volume.

17. The method of claim 11, wherein:

the known object comprises a nose with a known nose height; and said step of identifying comprises further identifying whether the detected object is the known object by detecting a nose height of the detected object and comparing the detected nose height to the known nose height.

18. The method of claim 17, wherein said step of identifying comprises comparing the detected nose height to the known nose height by taking a difference between the detected nose height and the known nose height.

19. The method of claim 18, wherein said step of identifying identifies the detected object as the known object only if the difference is less than or equal to a threshold difference.

20. The method of claim 19, wherein the threshold difference is 0.5 m.

21. The system of claim 1, wherein:
the shape of the detected object is detected in an area; and
the detected shape is compared only with shapes of objects which are expected in the area.

22. The method of claim 11, wherein:
the shape of the detected object is detected in an area; and
the detected shape is compared only with shapes of objects which are expected in the area.

23. The system of claim 1, wherein the profile corresponding to the known shape comprises an expected echo pattern corresponding to the known shape.

24. The system of claim 23, wherein the expected echo pattern comprises a two-dimensional data table whose dimensions are angular step and distance from a predetermined stopping position.

25. The system of claim 23, wherein the comparing means comprises means for shifting the profile corresponding to the known shape in accordance with a position of the detected object.

26. The method of claim 11, wherein the profile corresponding to the known shape comprises an expected echo pattern corresponding to the known shape.

27. The method of claim 26, wherein the expected echo pattern comprises a two-dimensional data table whose dimensions are angular step and distance from a predetermined stopping position.

28. The method of claim 26, wherein step (c) comprises shifting the profile corresponding to the known shape in accordance with a position of the detected object.

* * * * *